United States Patent
MacNeille et al.

(10) Patent No.: US 10,699,566 B2
(45) Date of Patent: Jun. 30, 2020

(54) METHOD AND APPARATUS FOR CONGESTION REDUCTION THROUGH COOPERATIVE ADAPTIVE CRUISE CONTROL

(71) Applicant: FORD GLOBAL TECHNOLOGIES, LLC, Dearborn, MI (US)

(72) Inventors: Perry Robinson MacNeille, Lathrup Village, MI (US); Nunzio Decia, Northville, MI (US); Joseph Wisniewski, Royal Oak, MI (US); Andrea Bowes Chowanic, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/067,877

(22) Filed: Mar. 11, 2016

(65) Prior Publication Data
US 2017/0263117 A1    Sep. 14, 2017

(51) Int. Cl.
| | |
|---|---|
| *G08G 1/01* | (2006.01) |
| *B60W 30/14* | (2006.01) |
| *G08G 1/052* | (2006.01) |
| *G08G 1/02* | (2006.01) |
| *G08G 1/0967* | (2006.01) |

(52) U.S. Cl.
CPC ......... *G08G 1/0145* (2013.01); *B60W 30/146* (2013.01); *G08G 1/0133* (2013.01); *G08G 1/02* (2013.01); *G08G 1/052* (2013.01); *G08G 1/096725* (2013.01); *G08G 1/096783* (2013.01)

(58) Field of Classification Search
CPC .......... B60W 50/0097; B60W 30/143; B60W 2550/20; B60W 2720/103; B60W 2720/106; B60K 2310/244; B60K 9/00785; G08G 1/012; G08G 1/22
See application file for complete search history.

(56) References Cited

U.S. PATENT DOCUMENTS

| | | | |
|---|---|---|---|
| 6,317,678 B1 * | 11/2001 | Linden .................... | B60K 31/04 123/350 |
| 6,321,162 B1 * | 11/2001 | Hessing ........... | G08G 1/096811 340/988 |
| 7,994,902 B2 | 8/2011 | Avery et al. | |
| 8,494,759 B2 * | 7/2013 | Hada .................... | G08G 1/0112 701/117 |

(Continued)

OTHER PUBLICATIONS

Jones, Stephen, "Cooperative Adaptive Cruise Control: Human Factors Analysis", Publication No. FHWA-HRT-13-045, U.S. Department of Transportation, Federal Highway Administration, Oct. 2013, 48 pgs., McLean, VA.

*Primary Examiner* — Thomas Ingram
(74) *Attorney, Agent, or Firm* — Mike Spenner; Brooks Kushman P.C.

(57) ABSTRACT

A system includes a processor configured to determine traffic density over a road segment. The processor is also configured to model traffic parameters to maximize traffic flow over the road segment, based on the traffic density and travel characteristic data received from a plurality of vehicles exiting the road segment. The processor is further configured to determine a speed to density curve, using the model, that would maximize traffic flow and send the speed to density curve to a vehicle entering the road segment.

4 Claims, 7 Drawing Sheets

(56) References Cited

U.S. PATENT DOCUMENTS

| | | | |
|---|---|---|---|
| 8,643,505 B2 | 2/2014 | Tsuda et al. | |
| 9,174,647 B2 * | 11/2015 | Rose | B60W 50/00 |
| 9,272,621 B2 * | 3/2016 | Sujan | B60K 31/00 |
| 2002/0198694 A1 * | 12/2002 | Yang | G06F 17/5009 |
| | | | 703/6 |
| 2012/0148094 A1 * | 6/2012 | Huang | G06K 9/00785 |
| | | | 382/103 |
| 2013/0060456 A1 * | 3/2013 | Pourparhizkar | G08G 1/22 |
| | | | 701/117 |
| 2013/0311076 A1 * | 11/2013 | Mieth | G01C 21/32 |
| | | | 701/119 |
| 2014/0032282 A1 * | 1/2014 | Fu | G07B 15/06 |
| | | | 705/13 |
| 2014/0244129 A1 * | 8/2014 | Filev | B60K 31/00 |
| | | | 701/93 |
| 2014/0244130 A1 * | 8/2014 | Filev | B60K 31/00 |
| | | | 701/96 |
| 2016/0097648 A1 * | 4/2016 | Hannah | G06K 9/00785 |
| | | | 701/118 |
| 2016/0379486 A1 * | 12/2016 | Taylor | G08G 1/0141 |
| | | | 340/905 |

* cited by examiner

METHOD AND APPARATUS FOR CONGESTION REDUCTION THROUGH COOPERATIVE ADAPTIVE CRUISE CONTROL

TECHNICAL FIELD

The illustrative embodiments generally relate to a method and apparatus for congestion reduction through cooperative adaptive cruise control.

BACKGROUND

Traffic congestion often begins at restrictive points, such as bridges, tunnels, and construction sites, where multiple lanes of traffic merge into a single lane, or where drivers must maintain travel in a lane through a narrow area (causing many drivers to slow down). While a little congestion may be harmless, around heavy-traffic times this can snowball into significant congestion, suddenly taking hours to sort itself out.

It has been observed that using different vehicles per minute (flow) passing a point, with varied given number of vehicles per mile, optimal flow can be achieved at somewhat less than a maximum number of vehicles per mile (bumper to bumper traffic). That is, if there were a way to control a number of vehicles spaced out over a given interval (such as a mile) and limit that to an optimal or near optimal number, and also to control the vehicle speed, traffic could continue to flow without hitting a point where no one can go anywhere (stopped, bumper to bumper traffic). Of course, it is nearly impossible to control the speed at which each driver drives, and to prevent vehicles from stacking up close to proceeding vehicles, such that traffic, in terms of vehicles per mile, over-reaches the optimization point.

One attempt at controlling flow includes installing lights or other traffic control devices at certain points. This requires substantial infrastructure, slows traffic unnecessarily at certain points to optimize flow at other points (by, for example, stopping each vehicle for a second or two), and can result in public annoyance against devices which may actually provide some advantage, but are perceived by the public as onerous and unnecessary.

SUMMARY

In a first illustrative embodiment, a system includes a processor configured to determine traffic density over a road segment. The processor is also configured to model traffic parameters to maximize traffic flow over the road segment, based on the traffic density and travel characteristic data received from a plurality of vehicles exiting the road segment. The processor is further configured to determine a change to traffic, using the model, that would improve traffic flow and send control instructions to a vehicle, to control the vehicle in accordance with the change.

In a second illustrative embodiment, a system includes a processor configured to wirelessly receive a speed to density curve, representing optimal vehicle speeds at given densities to maximize traffic flow. The processor is also configured to convert density values to headway values and control a vehicle speed to match a speed value, based on the speed to density curve, for a current headway available to a vehicle as measured by a vehicle sensor.

In a third illustrative embodiment, a system includes a processor configured to determine traffic density over a road segment. The processor is also configured to model optimal traffic parameters to maximize traffic flow over the road segment, based on the traffic density and travel characteristic data received from a plurality of vehicles exiting the road segment. The processor is further configured to determine a speed to density curve, using the model, that would maximize traffic flow and send the speed to density curve to a vehicle entering the road segment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
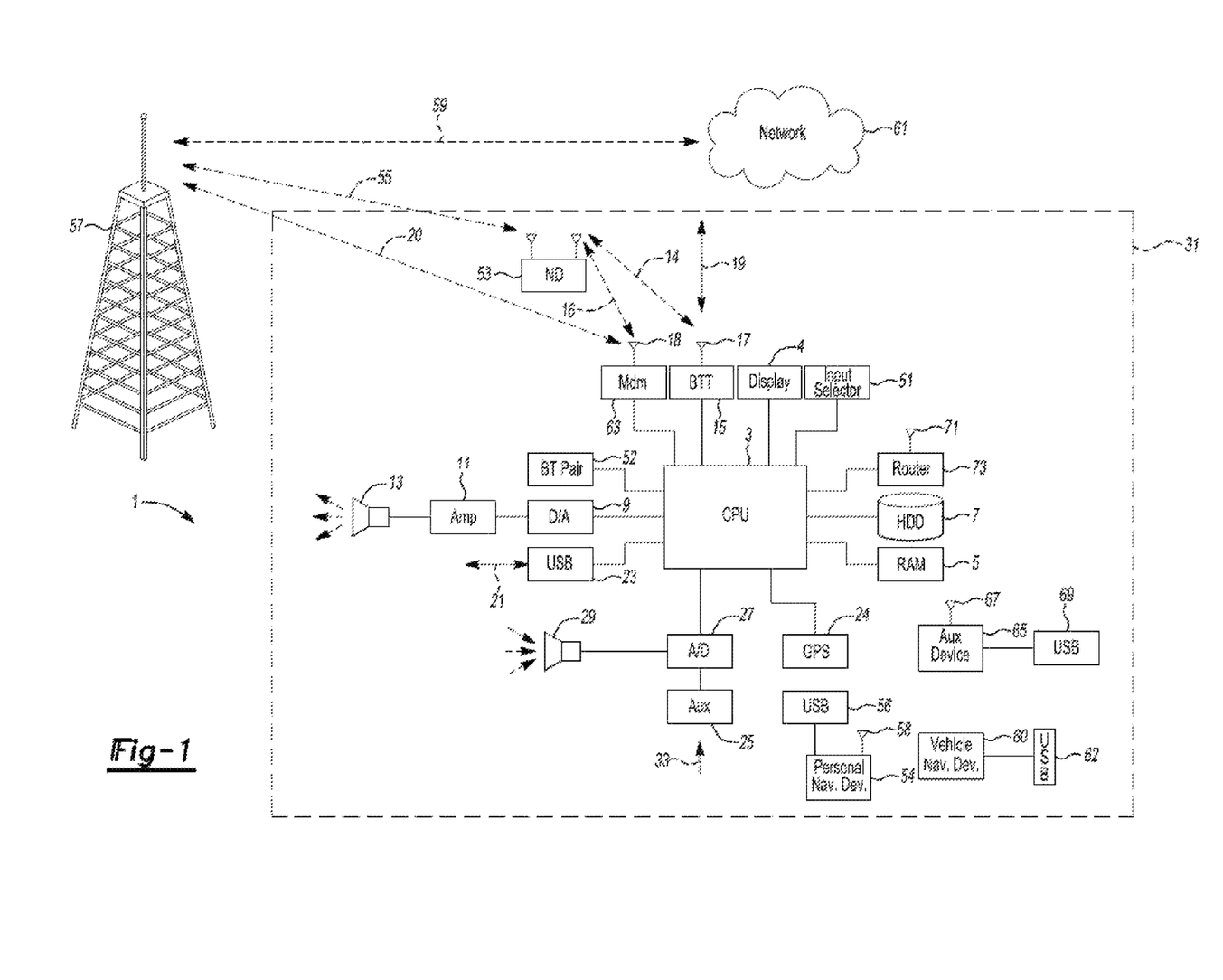
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing or bonding a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Problems can arise from constrictions in traffic flow due to lane closures, travel through tunnels or across bridges, etc. For example, in Manhattan, nearly two million vehicles enter and exit the island every business day. Further, the main transportation route, I-95, can carry several hundred thousand vehicles per day. As most or all of this traffic crosses bridges and tunnels, flow must be maintained at these choke-points, otherwise backups that can stop all traffic for a significant distance can occur.

The illustrative examples provide a solution leveraging cooperative adaptive cruise control (CACC) or other automated speed control of a vehicle, also including automated speed control of vehicles in communication with each other. Adaptive cruise control (ACC) can be installed and used in a single vehicle to control vehicle speed dynamically. Unlike conventional cruise control, which provides a fixed speed, adaptive cruise control can slow down if a vehicle nears a preceding vehicle, and then resume a speed when sufficient space to do so is realized (such as when the preceding vehicle accelerates). Cooperative adaptive cruise control leverages the ability of multiple vehicles to communicate with each other, so that vehicles can act in concert to achieve better speeds and flow.

Because vehicles are frequently restricted to present lanes, or a single lane of travel, when traveling through known choke-points, the presence of merely a few (sometimes as few as two) CACC enabled vehicles can be used to "regulate" the flow of traffic, by cooperatively regulating speed and distance between the CACC vehicles, so that the vehicles can "force" other vehicles to behave in a desired manner. Such behavior is relatively transparent from the perspective of the CACC drivers and other drivers, and yet optimal flow rates can be better achieved by controlling traffic in this manner.

For example, it may be determined that an optimal rate of six vehicles per minute results in a maximum flow speed and prevents congestion from either vehicles traveling too slowly, or vehicles traveling too closely. With just a few CACC vehicles scattered in a line of vehicles, the flow can be controlled and the speed can be controlled. By lowering an initial speed of a second or third CACC vehicle, the number of vehicles per mile can be limited until a desired spacing is reached, at which point the CACC vehicles can speed up to an optimal speed to move traffic along. While this is not perfect (since the CACC vehicles can't actually cause intervening vehicles to accelerate, for example, although they can cause intervening vehicles to slow down, by slowing a lead CACC vehicle), a measure of control over traffic flow can be achieved without having to install complicated infrastructure, and can be done so relatively transparently.

Generally, cooperation between two CACC equipped vehicles can be achieved by a lead vehicle sharing data such as, but not limited to, wheel speeds, odometer and accelerometer data with a trailing vehicle. This can be combined with GNSS data and the trailing vehicle can determine the distance to the lead vehicle (headway) based on the two vehicles' respective positions, any speed differences between the vehicles, and resultantly an amount of brake torque or powertrain torque needed to properly match the speed of the two vehicles. If there are intervening vehicles (and lane changing is not possible) cooperation between a lead and trailing vehicle can result in a measure of control over the speeds of the intervening vehicles.

Figure 2A:
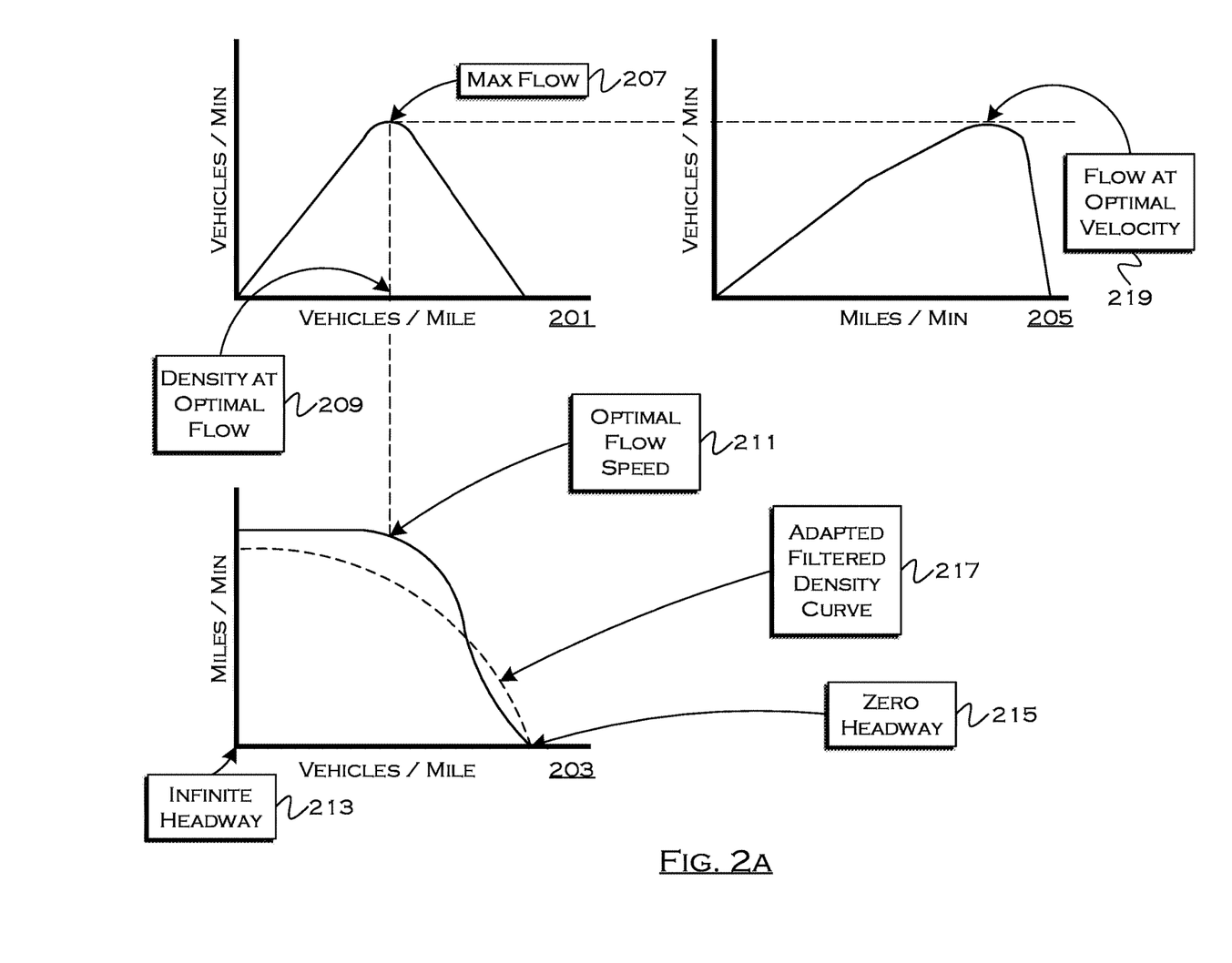
FIG. 2A shows illustrative traffic flow data charts.

FIG. 2A shows illustrative traffic flow data charts. In chart 201, it can be seen that a maximum vehicle flow 207 (where a maximum number of vehicles per minute passes a given point) is achieved by a traffic density 209 less than a maximum possible density. That is, by putting some number less than the maximum number of vehicles over a given interval, traffic actually moves more quickly and the best flow can be achieved. If each driver is left to their own devices, however, drivers may tend to travel too closely to a preceding vehicle, creating a situation where too many vehicles per mile are present, which 2A shows will actually slow traffic, reducing the total number of vehicles per minute passing a point. Historically, simply telling people that optimal traffic flow could be achieved if, for example, everyone trailed a leading vehicle by fifteen feet is a relatively fruitless enterprise, both because people will ignore this rule and because people tend to be bad at actually gauging fifteen feet (or any suitable distance) while traveling, especially at speed.

Chart 205 shows that a certain optimal speed results in a maximum flow 219, but just a small step over this speed can quickly reduce flow to near-zero. For example, if all vehicles traveled at fifty five miles per hour, maximum flow might be achieved, because of the resulting density, but a few vehicles exceeding this speed can cause increases in density, which can quickly reduce flow to near-zero. Experience has shown this speed to be near, but below, the maximum speed for a given stretch of road.

FIG. 203 shows a comparison of density (vehicles per mile) and velocity (miles per minute) for a given stretch of road. This curve tends to be arbitrary in nature, varying for different stretches of road, and can be learned and modeled by an adaptive filter for a given stretch of road. For the example shown (which is an illustrative, arbitrary stretch of road), optimal flow 211 is achieved at slightly below the maximum velocity (dictated by the speed limit) at a density of somewhat less than the maximum possible density. As can be seen by the chart, when density is near-zero, the maximum speed can be traveled, because there is plenty of headway for each vehicle (infinite headway 213 when one or zero vehicles are present per mile). This doesn't result in maximum flow (from a total vehicle perspective), however, because only a few vehicles are on the road, thus only a few vehicles flow past any given point in a unit of time. As density increases, speed will naturally decrease, until the density reaches a point of zero headway 215, which is a bumper to bumper traffic situation. At this point, speed (and thus flow) is reduced to near-zero levels. Once a density curve for a given road segment is calculated, it can be loaded into CACC equipped vehicles, so that the vehicles can cooperate in the manner described herein, to attempt to limit density to a near-optimal point, allowing for maximum flow and preventing backups.

Figure 2B:
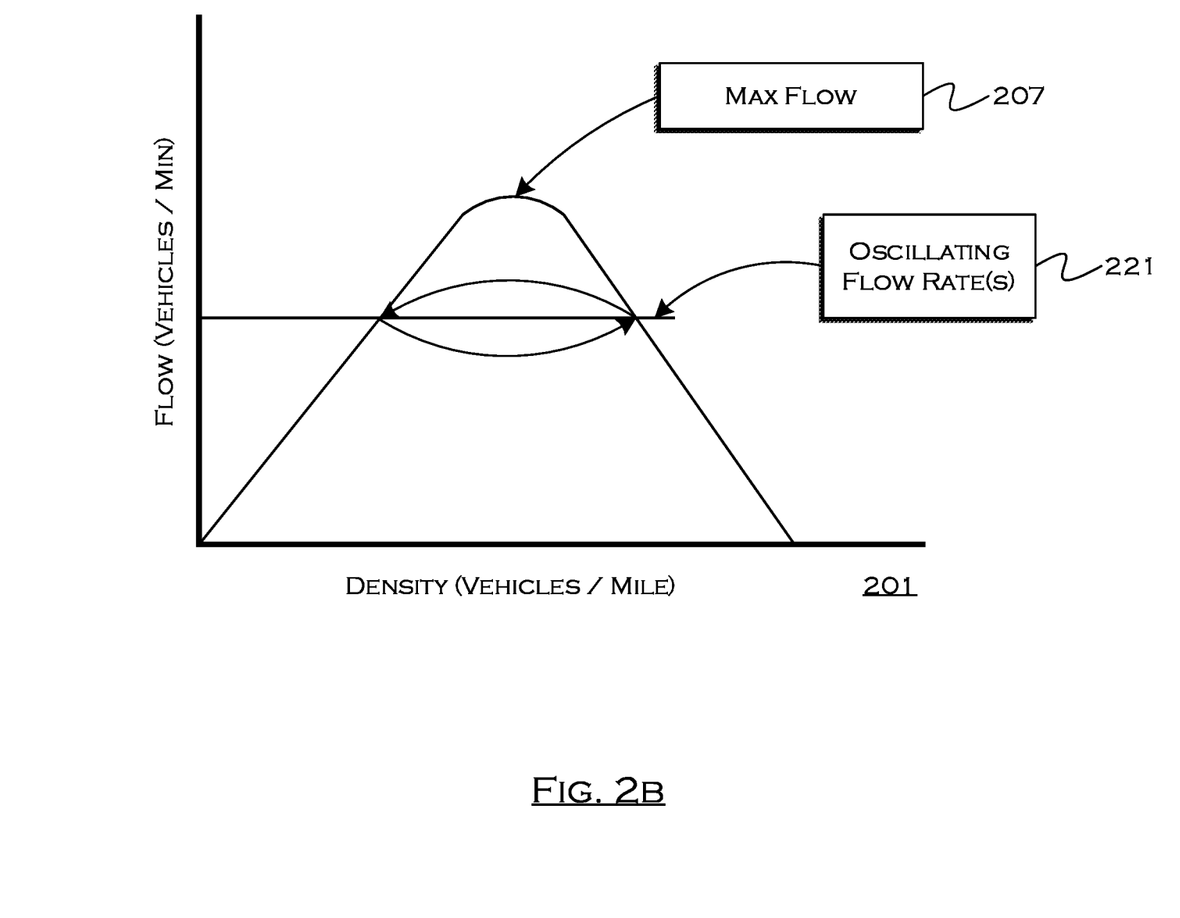
FIG. 2B shows the effect of oscillating traffic patterns based on human driver behavior.

FIG. 2B shows the effect of oscillating traffic patterns based on human driver behavior. While a maximum flow 207 could be achieved at an optimal density, the realities of human-controlled traffic tend to result in fluctuations between higher and lower densities over a given stretch of road, resulting in oscillating flow rates 221. More vehicles traveling at a slower speed periodically becomes fewer vehicles travelling at a higher speed, resulting, in both cases, in sub-optimal flow. Since it is virtually impossible for all drivers to act in concert, it is equally difficult to achieve the optimal density where the most vehicles traveling at the best achievable speed are present over a given road segment. And if density increases too much, the flow can drop quickly to near-zero conditions. Density for a given section of road can be defined by the number of vehicles in the section of road, divided by the length of the road section minus the sum of all vehicle lengths. Thus, a simple sensor that can measure vehicle length and number of vehicles passing by can be used to determine the density at any given time, for a defined segment of road past the sensor (assuming no traffic can enter from any other source point). This known density can be used by the CACC vehicles to determine if density is too high (which can cause the vehicles to slow, causing other intervening vehicles to slow, to lower density) or if density is too low, which can cause the CACC vehicles to accelerate up to, if appropriate, a maximum speed, to move as much traffic through as possible while density is low. This does rely somewhat on the non CACC vehicles to accelerate, but it can generally be assumed that a driver driving below the speed limit will accelerate to at least the speed limit if provided with sufficient headway to do so. It has been observed that drivers will generally accelerate too fast, which propagates traffic waves.

Figure 3:
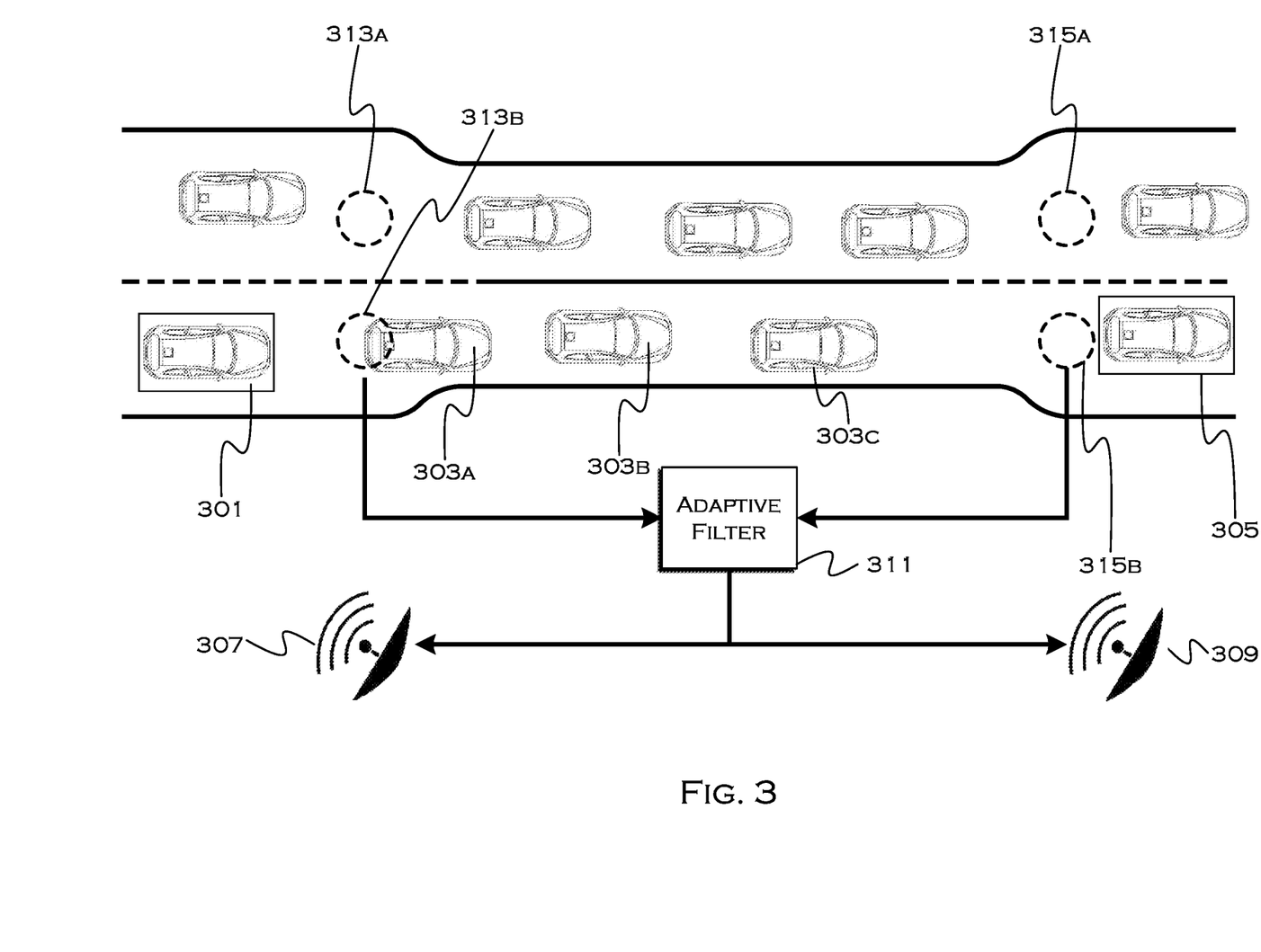
FIG. 3 shows an illustrative example of a cooperative adaptive cruise control implementation.

FIG. 3 shows an illustrative example of a cooperative adaptive cruise control implementation. In this illustrative example, several vehicles are approaching a point (such as a bridge or tunnel) of fixed-lane or narrow-lane travel. Two CACC equipped vehicles 301, 305 are present, as well as a number of other vehicles 303A, 303B, 303C.

Once an optimal density to velocity curve is known for the narrowed or constrained road-region (which can be learned through observation and can be adapted as needed based on any changing conditions), this curve can be used to control the speed of vehicles (and thus control the density of vehicles) through the given stretch of road.

Leading into the stretch of road, a roadside-to-vehicle unit 307 can broadcast an optimal speed and headway to any CACC equipped vehicles. CACC vehicles are also ACC vehicles, so they can personally (i.e., without cooperation from other CACC vehicles) control how much headway they have with respect to a preceding vehicle. Generally, the headway of non-ACC-utilizing, human drivers, is based on a number of psychological factors such as the nature of the roadside, weather conditions, day/night, etc. By acting in concert with other CACC vehicles, they can also control the speed and density of any intervening vehicles, between CACC vehicles. So, for example, if density over the stretch of road was too high, the trailing vehicle 301 could slow to allow density to thin-out, and then accelerate to an appropriate speed once density had thinned. At the same time, assuming sufficient headway was present, the lead CACC vehicle 305 could speed up, to encourage the intervening vehicles to speed up, accelerating the thinning of density.

At the end of the road segment, a second roadside sensor 309 with roadside-to-vehicle communication capability can query exiting CACC vehicles to determine travel history over the road segment. This travel history can be used to by an adaptive filter 311 to build a density to velocity curve for the road segment (which is then fed back to CACC vehicles entering the segment, so that the described control over non-CACC vehicles can be achieved). Since flow rate generally and length of vehicles is useful in both modeling and for knowing present flow and density, roadside sensors 313A and 313B can measure vehicle length and flow rate into an area of constraint, and sensors 315A and 315B on the back-end of the road segment can measure flow rate and vehicle length (useful for exit-density calculations) out of the area of constraint. Power-weight ratio (maximum acceleration) and brake efficiency (maximum deceleration) are known by the vehicles and can provide additional useful data as input to the adaptive filter.

Figure 4:
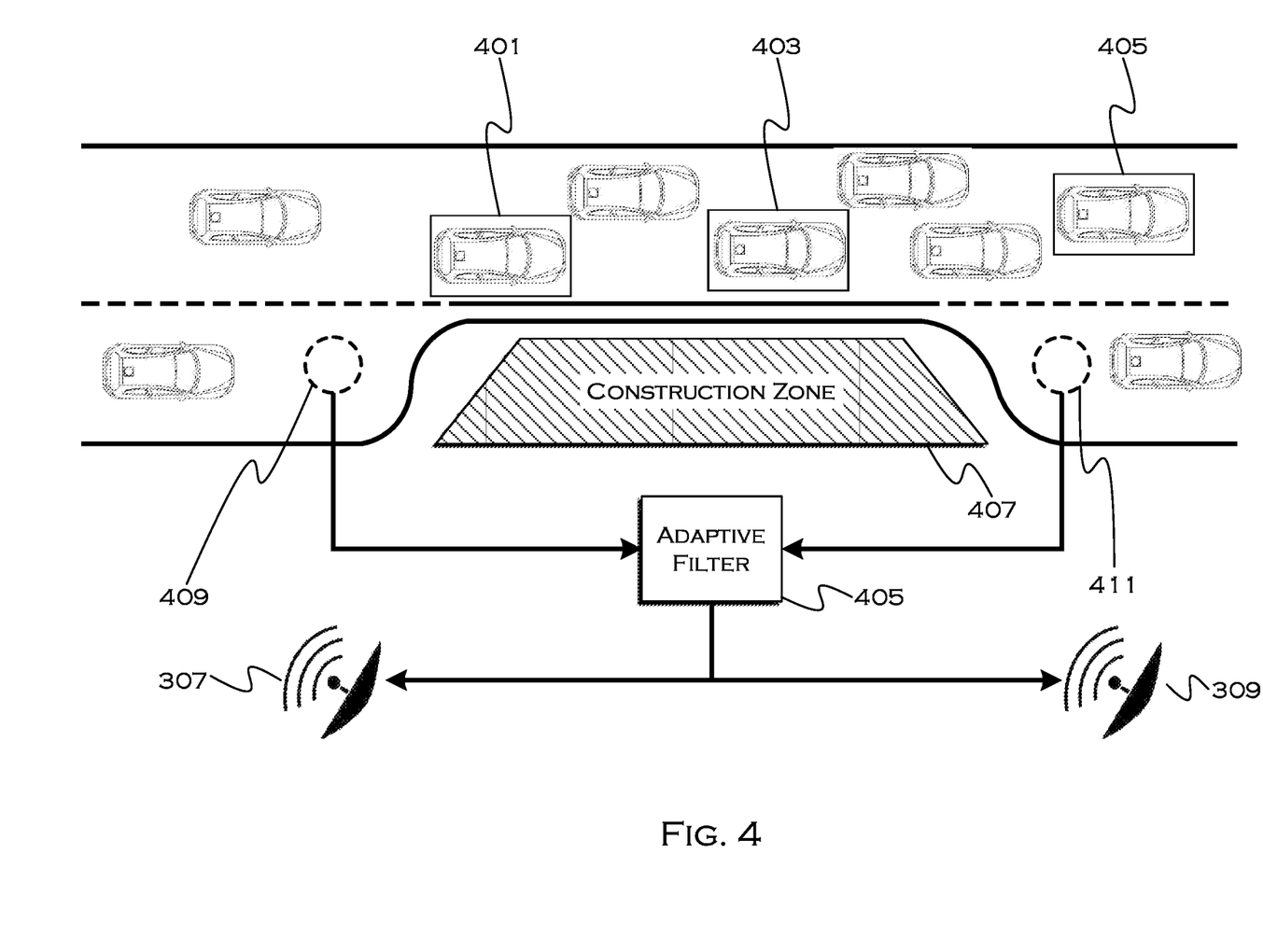
FIG. 4 shows a further illustrative example of a cooperative adaptive cruise control implementation.

FIG. 4 shows a further illustrative example of a cooperative adaptive cruise control implementation. In this example, portable roadside-to-vehicle communication points 307, 309 can be temporarily set up, with an adaptive filter 405 provided to model the density to velocity curve for a construction zone. Flow and vehicle length sensors 409, 411 can also be temporarily deployed and fed into the filter for modeling. As before, a limited number of CACC equipped vehicles 401, 403, 405 can be advantageously used to control traffic density and speed through the construction zone to maximize flow, based on, for example, a model developed by the adaptive filter and fed to CACC vehicles entering the zone.

While some measure of traffic control can be realized using ACC vehicles (because they can be slowed or accelerated to control trailing vehicles), CACC vehicles provide the potential for even better flow control. For example, if vehicle 401 knows that vehicle 403 is accelerating (which will hopefully cause the intervening vehicle to accelerate), vehicle 401 can then accelerate when sufficient headway is present, because vehicle 401 will "know" that preceding density is thinning. If ACC alone were used, vehicle 401 might have to make some assumptions about preceding density measured solely by the sensors, which could be fairly inaccurate over a long stretch of construction (since exit-density might not represent present density within the zone). Since the vehicles 401, 403 and 405 can act concertedly, however, they can work together to control density throughout the zone, helping to achieve better vehicle throughput. This is not to say that the present concepts cannot also be used with ACC vehicles, simply that a higher degree of control over non-ACC or non-CACC vehicles can be achieved through CACC. CACC vehicles can control the distance between them even when there are intervening vehicles.

Figure 5:
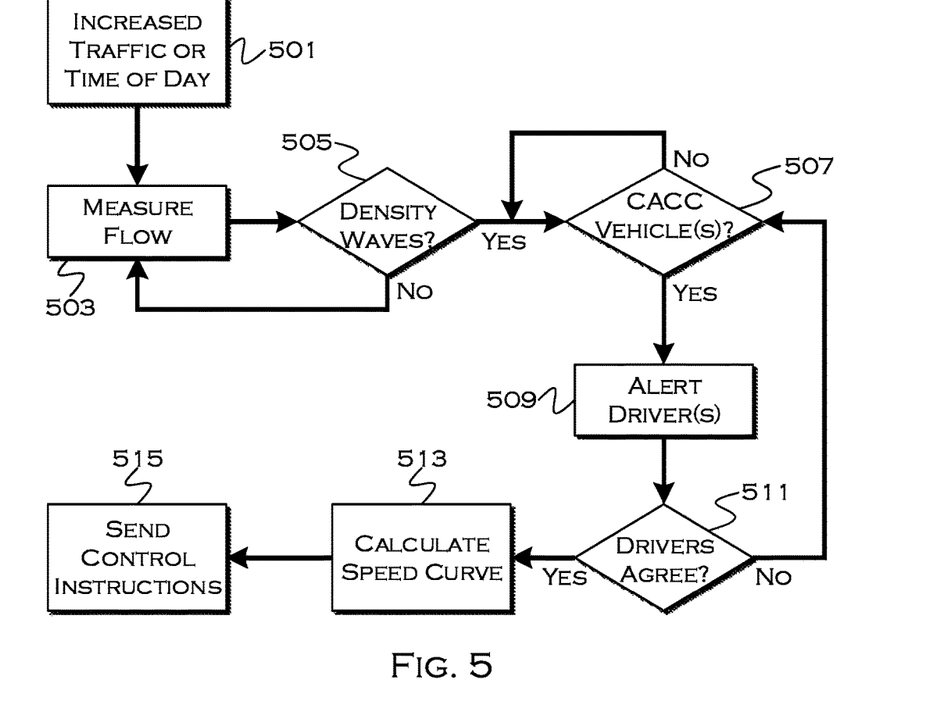
FIG. 5 shows an illustrative process for controlling traffic flow and speed using cooperative adaptive cruise control.

FIG. 5 shows an illustrative process for controlling traffic flow and speed using cooperative adaptive cruise control. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a system can predict or detect increased traffic in a control-zone (a stretch of road or road segment over which flow-control may be desirable) or leading up to a control zone 501. Additionally or alternatively, known times-of-day (e.g., rush hour, lunch hour, etc) can be used to predict increased traffic flow before it occurs en masse. Sporting events and concerts can also frequently cause irregular traffic patterns, and the effect of these can be mitigated somewhat in a similar manner, by controlling the flow through choke points until sufficient time after the inception or completion of the event has passed.

In this example, the process can begin to measure the flow of traffic 503, to determine if density waves 505 are forming. In other examples, density can simply be measured until a density that would result in sub-optimal flow begins to develop. Other triggers for engaging traffic controls can also be used. While density remains below an optimal flow point (as known by density and speed), it may be desirable to leave traffic unfettered, since there are simply too few vehicles to create congestion. Once the density rises past the optimal flow point, however, the likelihood of density waves increases (assuming the spike in density wasn't simply a one-off occurrence), and implementing flow-control can help mitigate the effect of these waves.

When a trigger (presence of density waves, density above optimal point, time of day, slopes that trigger waves, etc) occurs, the process can determine if there are any CACC vehicles present 507. If only a single CACC vehicle is present, the vehicle effectively becomes an ACC vehicle, and a limited version of flow control may be enacted (e.g., it can control trailing vehicles, but not preceding vehicles). Once two CACC vehicles are present, flow control over intervening and trailing vehicles can be achieved.

In this example, the drivers of the CACC vehicles are provided with notification 509, informing them, for example, that CACC will be engaged or is desirable to help control traffic flow. Of course, the driver is not forced to allow the CACC, but can choose to agree with CACC engagement to facilitate traffic flow and help move everything along. If the driver agrees 511, the process can continue, otherwise the process loops until multiple CACC vehicles are present or until a point where density permanently this to where CACC flow control assistance is no longer needed (this can also be represented by a time-of-day when rush hour or lunch hour ends, or, for example, when an event has begun some time ago or ended some time ago, if using event-based flow control, etc.)

In this example, a density to velocity curve is modeled by the adaptive filter 513, although such modeling may have been done at some previous point in time. Based on the model, and a measured current density and speed, for example, CACC instructions can be developed for a CACC vehicle entering the flow restrictive area. If density is too high, the CACC vehicle can be told to act in concert with a preceding CACC vehicle to thin out density (for example, by slowing while the preceding CACC vehicle accelerates, if possible). If density is too low (and assuming that a too-high density had already been at least once achieved, thus the low density represents a portion of a wave), the CACC vehicle can be told to act in concert with a preceding CACC vehicle to increase density (for example, by accelerating, if possible, while the preceding CACC vehicle slows). If the low density is a result of density waves, by increasing density over the distance between the two CACC vehicles, this will naturally decrease density, to some level at least, in a region preceding the leading CACC vehicle (of the two CACC vehicles), providing for a more even density flow over a stretch of road preceding the leading vehicle following the density increase (since the increased density can be, at least somewhat, maintained by the vehicles acting in concert). The instructions, adapted to current situations, can be sent to each CACC vehicle as it enters the restrictive zone 515.

Figure 6:
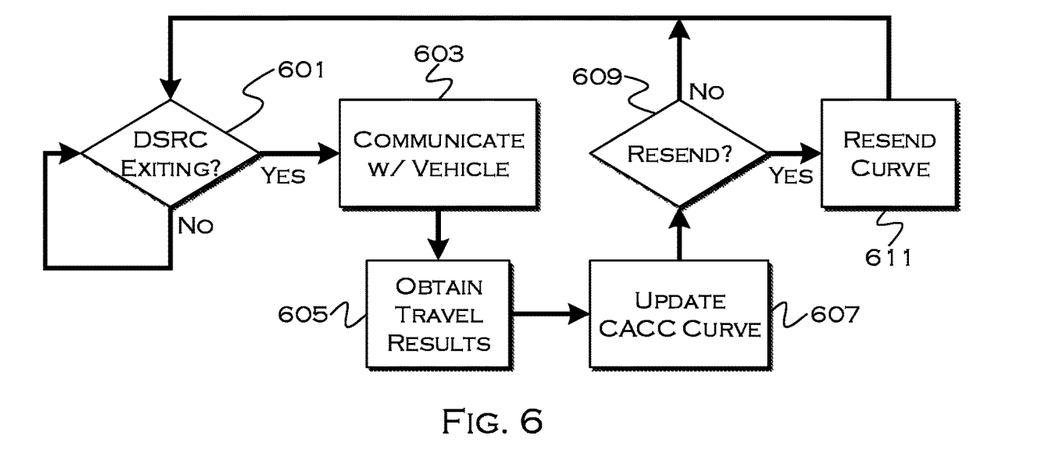
FIG. 6 shows an update process for updating a flow-model usable to determine cooperative adaptive cruise control instructions.

FIG. 6 shows an update process for updating a flow-model usable to determine cooperative adaptive cruise control instructions. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this example, modeling for a density to velocity curve is shown, and a similar process can be applied to develop new instructions for trailing vehicles. As a CACC vehicle exits a restrictive zone 601, a roadside-to-vehicle sensor can communicate with the CACC 603 vehicle to obtain travel results from within the zone 605. In this example, the vehicle need not even be CACC equipped for modeling purposes, but merely be capable of some form of wireless communication (e.g., DSRC, WiFi, BT, BLE, LTE-Direct, etc) with the sensor. Since there will likely be more wireless communication capable vehicles than CACC equipped vehicles, a greater number of vehicles can be sampled for data to build a model or develop a change in instructions.

The travel results can include, but are not limited to, speeds though the restrictive zone, acceleration and braking through the zone, observed headways (measureable by vehicle sensors) through the zone, etc. This data, along with measured velocity and density data for entering and exiting vehicles, can be used to model an optimal density to velocity curve for the restrictive zone 607.

The model can be consistently updated, and if an observed change in the curve is noted, it may be desirable 609 to send a modified curve 611 to a module designated for determining CACC control instructions (e.g., if an optimal density or velocity changes, this information can be used to determine "better" instructions for entering CACC vehicles). Additionally or alternatively, the measured and gathered data can be used to update instructions for a next-CACC vehicle and/or CACC vehicles already in the zone. If this data results in new instructions or updated instructions, these new or updated instructions can be similarly transmitted.

While the illustrative examples show CACC instruction transmission at the entry point to a zone, it may also be possible to deploy (or leverage existing infrastructure, such as DSRC infrastructure) transceivers throughout the restrictive zone. This allows for update of instructions to some or all CACC vehicles within the zone, which can further the cause of optimizing flow through constantly refined control instructions.

Figure 7:
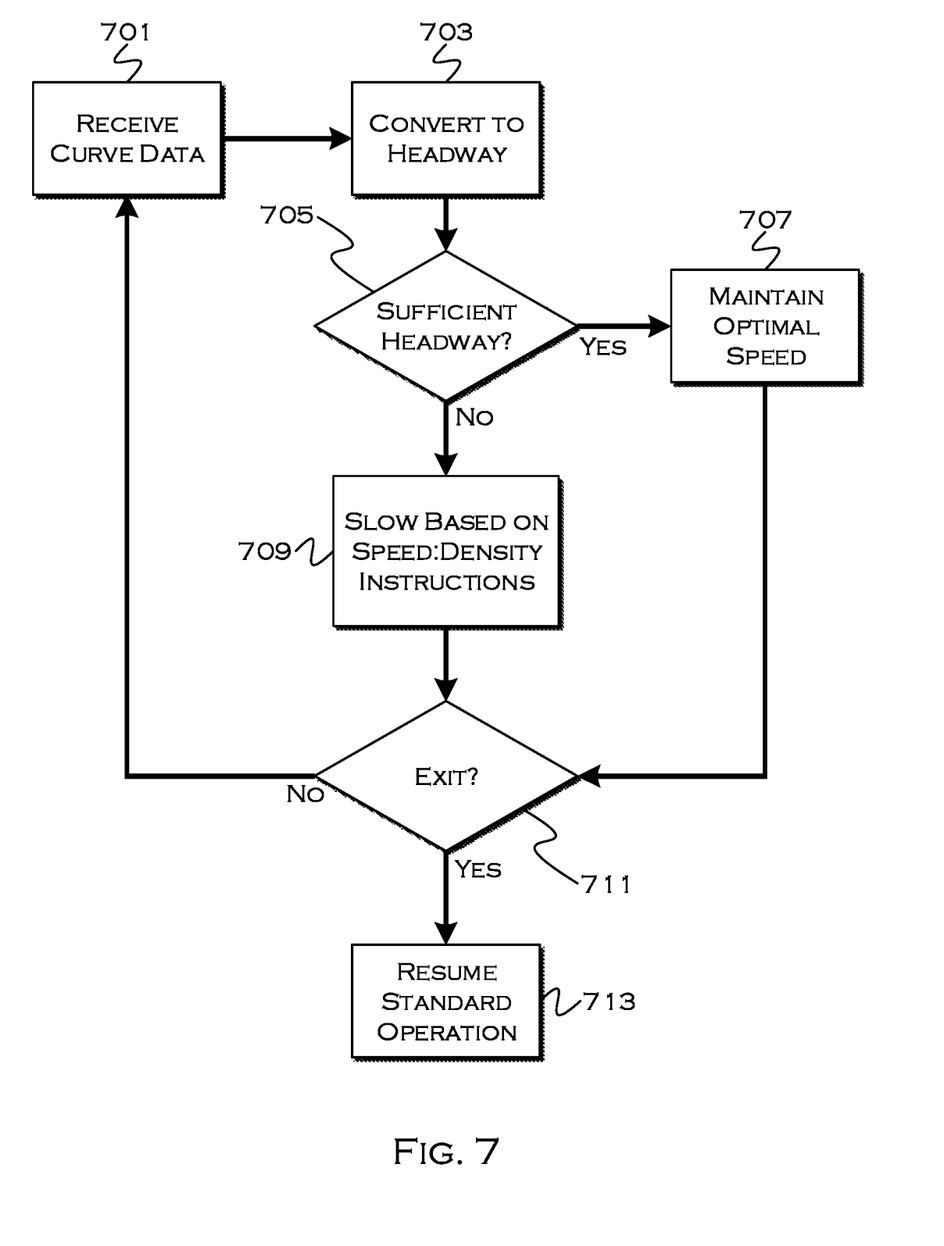
FIG. 7 shows an illustrative process for controlling traffic flow using CACC vehicles.

FIG. 7 shows an illustrative process for controlling traffic flow using CACC vehicles. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this example, a speed to density curve is determined based on the velocity to density model developed for a given road segment. CACC vehicles can convert density into headway distance (e.g., a given headway approximates a given density).

In this example, each CACC vehicle passing a transceiver can receive the desired curve data 701, indicating a desired speed at a given density. The CACC vehicle can convert density into headway 703, so that the CACC vehicle knows what speed to maintain based on how much headway is present. Since an optimal speed is known (optimal in terms of maximizing flow) from the modeling, the CACC vehicle can maintain the optimal speed, regardless of headway. This allows the CACC vehicles to "absorb" density waves, which could be created if a vehicle leading the CACC vehicle is suddenly forced to slow. A large headway (which can develop when a non-CACC vehicle leading a CACC vehicle accelerates past the optimal speed) acts as a buffer for the non-CACC vehicle slow-down, allowing the CACC vehicle to continue, at least for some period, at the optimal speed (until the headway shrinks to a point dictating a lower speed). This can help the CACC vehicle prevent the density waves from gaining strength.

If sufficient headway exists for optimal travel 705, the CACC vehicle will maintain optimal travel speed 707. As noted, this speed may be maintained even if a vehicle leading the non-CACC vehicle accelerates, increasing the headway. As insufficient headway develops, the CACC vehicle will slow based on the speed to density curve instructions 709. As density increases and headway diminishes, the CACC vehicle will attempt to maintain a prescribed speed for the available amount of headway. At any point where headway reaches a distance allowing optimal travel speed (again, optimal in terms of flow optimization), the CACC vehicle will accelerate up to the optimal speed. When the CACC vehicle reaches an exit point 711, representing the end of the road segment, the CACC vehicle can resume "normal" operation 713. For example, if the optimal speed over the road segment was 55 miles per hour (mph), and the speed limit was 60 mph, the CACC vehicle could accelerate to 60 miles per hour upon leaving the road segment, since flow control was no longer needed at that point.

While it may seem contrary that a vehicle, given sufficient headway, would travel at a sub-maximum speed, this can actually result in improved traffic flow over a given road segment during a period of high traffic, as can be seen from FIG. 2A. For example, because density waves are prevented from gaining strength, resulting in ever-increasing slow downs, sub-maximum travel speeds controlled by CACC vehicles can be used to move traffic faster through areas where these waves tend to develop. More generally, a plurality of CACC vehicles can be used in concert with a set of instructions to restrict the speeds of intervening and trailing traffic, as well as increasing or decreasing traffic density.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a processor configured to:
   wirelessly receive a speed to density curve, representing vehicle speeds at given densities to maximize traffic flow;
   convert density values to headway values; and
   control a vehicle speed to match a speed value, based on the speed to density curve, for a current headway available to a vehicle as measured by a vehicle sensor.

2. The system of claim 1, wherein the speed to density curve includes a maximum optimal speed, representing a maximum speed for promoting maximum traffic flow.

3. The system of claim 2, wherein the maximum optimal speed is lower than a speed limit.

4. The system of claim 2, wherein the processor is configured to limit the vehicle speed to the maximum optimal speed, regardless of current headway available.

* * * * *